United States Patent [19]
Nys

[11] Patent Number: 5,060,388
[45] Date of Patent: Oct. 29, 1991

[54] MEASURING STRIP

[75] Inventor: Pierre H. Nys, Berchem, Belgium
[73] Assignee: Agfa-Gevaert N.V., Mortsel, Belgium

[21] Appl. No.: 627,832
[22] Filed: Dec. 17, 1990
[30] Foreign Application Priority Data
Jan. 19, 1990 [EP] European Pat. Off. ........ 90200144.5
[51] Int. Cl.[5] ........ G01B 3/00
[52] U.S. Cl. ........ 33/1 BB; 33/1 B
[58] Field of Search ........ 33/1 BB, 1 B, 1 C, 1 R, 33/1 K, 1 L, 1 S; 355/40, 77

[56] References Cited
U.S. PATENT DOCUMENTS
3,109,239 11/1963 Wicker et al. ........ 33/1 BB
4,527,333 7/1985 Warner ........ 33/1 B

*Primary Examiner*—Harry N. Haroian
*Attorney, Agent, or Firm*—William J. Daniel

[57] ABSTRACT

A measuring strip for evaluating the quality of photographic half tone images which contains on a transparent base a test field (F) divided into at least two sub-fields, wherein (1) a first sub-field ($F_1$) contains a plurality of individual areas each containing a group of opaque dots, wherein each individual area has dots of substantially equal size uniformly distributed in a transparent background area, and wherein (2) a second sub-field ($F_2$) contains a plurality of individual areas each containing a group of transparent dots of substantially equal size uniformly distributed in an opaque background area, and wherein in each individual area containing (opaque or transparent) dots having substantially the same dot size the dots are at substantially equal distance from each other measured center-to-center and the dots are graduated in size in the areas of each said sub-field so that an area containing dots of smaller size contains more dots than an area containing dots of larger size, and wherein the light transmission of said first and second sub-field expressed as a percentage is different by at least 10%.

9 Claims, 1 Drawing Sheet

| μm | $F_1$ | $F_2$ |
|---|---|---|
| 4 | $F_{11}$ | $F_{21}$ |
| 6 | $F_{12}$ | $F_{22}$ |
| 9 | $F_{13}$ | $F_{23}$ |
| 12 | $F_{14}$ d  | $F_{24}$  |
| 15 | $F_{15}$ | $F_{25}$ |
| 20 | $F_{16}$ | $F_{26}$ |
| 25 | $F_{17}$ | $F_{27}$ |
| 30 | $F_{18}$ | $F_{28}$ |
| 40 | $F_{19}$ | $F_{29}$ |

MEASURING STRIP

DESCRIPTION

1. Field of the Invention

This invention concerns a measuring strip for use in evaluating the quality of photographically produced graphic art work.

2. Background of the Invention

Measuring strips are used for the evaluation of photographic processes, relating for example to the photographic production of printing plates starting from photographically produced screen dot images (halftone images). The measuring strip contains a test field serving for evaluating the image quality of the halftone images obtained in photographic reproduction, and more especially for determining the influence of scattering effects on e.g. image resolution and image sharpness.

In known measuring strips a test field contains groups of lines with in each group the same number of lines but of different (decreasing) line width from group to group, so that the width of individual groups becomes increasingly smaller with decreasing line width. In measuring strips of this type, the density (i.e. the ratio between the non-transparent area covered by the lines and the total area) is about 50% in all the groups of the test field.

The greater the light scattering during photographic exposure in the reproduction steps, the smaller the number of groups that is reproduced with their lines still distinguishable from each other, thus yielding a measurement of the resolution of the image reproduction.

Such measuring strip has several disadvantages. The width of the groups with narrow lines is so small that optical evaluation is exceptionally difficult and time consuming. In particular, with this known type of measuring strip the resolution of the image transfer cannot be satisfactorily judged. For example, if the measuring strip is over-exposed, depending on the subsequent development some of the groups with fine lines will not be correctly reproduced anymore. The same effect will occur in the case of over-development, even if the exposure is correct. Thus the optimum exposure and development conditions cannot be satisfactorily determined.

In German Offenlegungsschrift (DE-OS) 2 426 840 a measuring strip is described wherein on a transparent base a test field consists of several groups, each of which has lines of equal width separated by slits, where the individual groups have lines of different width, characterized in that (1) the test field (K) is divided into at least two sub-fields (K1, K2), one of which (K1) has a low density and the other of which (K2) has a high density, and that (2) in both sub-fields the total length of the lines of equal width belonging to an individual group increases with decreasing line width from group to group.

In this case the transmission is taken to be the ratio of the non-transparent area to the total area, in accordance with the usual definition.

From said measuring strip has been said that it avoids the disadvantages of the above mentioned known types of measuring strips, so that scattering effects and the optimum exposure and development can be determined with one and the same test field, without expensive special equipment but with satisfactory statistical accuracy.

The division of the test field into at least two sub-fields with different density makes it possible to use said test field to evaluate not only the scattering but also the optimum values for exposure and development. For example, if at a certain over-exposure individual groups with a certain line width in the sub-field with low density are not reproduced, then in the sub-field with high density the lines separated by slits of the corresponding width will be reproduced. Thus, after development the fact that over-exposure has occured can clearly be seen. Conversely, if there is under-exposure, then individual groups in the sub-field with high density will not be reproduced (the slits will disappear), while in the sub-field with high density the lines separated from each other by slits of the corresponding width will nevertheless be reproduced. The fact that under-exposure has occured will thus be equally clear. Once the optimum exposure is found by this means, the optimum development can be determined by comparing those lines and slits with the smallest width which are still reproduced in both sub-fields.

As a result of the increasing total length of lines with equal width belonging to the individual groups in said last mentioned measuring strip, even the groups containing a set of narrowst lines still have sufficient width for a determination, while the longer length of the narrowest lines offers sufficient statistical accuracy, which is important due to the increasingly difficulty of reproduction relating to the decreasing line width.

3. Summary of the Invention

It is an object of the present invention to provide a measuring strip improving the accuracy of evaluation of the quality of photographic halftone prints and being particularly suited for determining the correct exposure dose in halftone photography to be applied to a photographic material, e.g. photographic silver halide emulsion material or photosensitive printing plate material, under selected conditions of image processing (halftone image development).

Other objects and advantages of the present invention will become clear from the following description.

In accordance with the present invention a measuring strip is provided which contains on a transparent base a test field (F) divided into at least two sub-fields, wherein (1) a first sub-field ($F_1$) contains a plurality of individual areas each containing a group of opaque dots, wherein each individual area has dots of substantially equal size uniformly distributed in a transparent background area, and wherein (2) a second sub-field ($F_2$) contains a plurality of individual areas each containing a group of transparent dots (holes), wherein each individual area has transparent dots of substantially equal size uniformly distributed in an opaque background area, and wherein in each individual area containing (opaque or transparent) dots having substantially the same dot size the dots are at substantially equal distance from each other, so that an area containing dots of smaller size compared with another area containing dots with larger size contains more dots than said area containing dots of larger size, and wherein the transmission of said first and second sub-field being expressed in percentage is different by at least 10%.

The evaluation of halftone copies obtained on photographic materials, e.g. photosensitive silver halide emulsion materials, by exposure through measuring strips according to the present invention can be done with the naked eye or with a magnifying glass; thus no expensive special equipment is necessary.

DETAILED DESCRIPTION OF THE INVENTION

Figure 1:
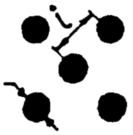
FIG. 1 represents a drawing of an enlarged test field present in an example of a measuring strip according to the present invention.
Figure 1:
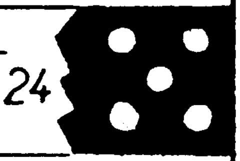

In a preferred measuring strip according to the present invention the individual areas in their sub-field have the same transmission. The transmission of said first and second sub-field differs preferably by at least 60 to 80%.

The measuring strip according to the present invention containing dots instead of lines makes it easier to determine the correct exposure since the change in size of photographically produced dots occurs more rapidly than a change in size of a line. Such follows from the fact that the ratio C/S of the circumference ($C=2\times l$) to the entire surface ($S=l\times w$) of a line with length (l) and comparatively small width (w) is larger than the ratio of the circumference (C) of a dot to its entire surface (S).

For example, of a square dot the C/S ratio is 4/b, since its circumference is equal to $C=4\times b$ and its entire surface (S) is equal to $S=b^2$, wherein b is the length of the edge of one square.

For a circular dot the C/S value is likewise 4/b, since its circumference is equal to $C=\pi\times b$, wherein b is the diameter, and its entire surface (S) is equal to $S=\pi\times b^2/4$.

Square type and circular dots have as can be learned from said equations twice as much circumference length for a same entire surface area as a thin line and therefore in over-exposure will obtain more rapidly an increase in size than lines and consequently represent for halftone imaging purposes a better tool for correct exposure dose evaluation than test fields with lines.

The measuring strip according to the present invention is not limited to test fields with circular or square type dots; any regular shape of dot, e.g. elliptical or hexagonal, may be present.

In a preferred embodiment of a measuring strip according to the present invention said test field contains in each sub-field at least four groups of dots, more preferably six; one sub-field ($F_1$) being of high transmission, and the other sub-field ($F_2$) being of low transmission, said sub-fields differing in % transmission at least 10%. For example, sub-field ($F_1$) has groups of dots wherein each group has 80% transmission, and sub-field ($F_2$) has groups of dots wherein each group has 20% transmission.

In a preferred measuring strip the distance between the dots (opaque or transparent) of equal diameter in individual areas of the same sub-field increases from one the next to area in the same ratio by which the diameter of the dots decreases, thus giving constant transmission per sub-field. Such makes possible simple visual evaluation, since the eye is very sensitive to differences in transmission.

In a particularly useful embodiment of the measuring strip according to the present invention the areas containing a group of opaque dots with a particular dot diameter of one sub-field are adjacent to areas containing a group of transparent dots of same diameter in the other sub-field. Such allows particularly easy comparison of dot diameters with magnifying glass that for correct reproduction have to be the same in adjacent areas of the print of the measuring strip.

In order to guarantee sufficient statistical accuracy when copying particularly small dots, and in order to guarantee good visual perceptibility, it is preferred for the smallest dots in the test field to have a minimum diameter of 4 micron.

According to an embodiment the measuring strip according to the present invention contains said test field (F) divided into said sub-fields ($F_1$) and ($F_2$) in conjunction with a series of halftone areas adjacent to each other having a different transmission ranging from 1 to 99% transmission with increments in transmission of 1% in the group of areas with 1 to 5 and 95 to 99% transmission and increments in transmission of 5%, preferably of 10%, in the group of areas with 5 to 95% transmission. The first sub-field ($F_1$) has a higher transmission than the second subfield ($F_2$).

In the measuring strip according to the invention it is preferable that the edge unsharpness of the dots or holes in each case is not greater than 2 $\mu$m. Measuring strips with test fields containing dot structures with such a low value for the edge unsharpness can be manufactured in the following way:

A glass plate is coated with chromium by vapour deposition and then coated with a light-sensitive photoresist resin layer. A halftone element containing the desired dot pattern is at high magnification cut out of non-transparent film and reduced to the desired size on a halftone silver halide emulsion film. The photo-resist layer on the chromium layer is exposed, optionally repeatedly (in step-and-repeat camera), with the desired dot patterns (groups of dots), and wash-off developed whereupon the chromium layer is etched away in the bare parts. In this way a very sharp chromium mask is made in an original format, from which film copies can be made.

The present invention is now explained with an Example illustrated by drawing FIG. 1. The invention is not restricted thereto.

For obvious reasons, the representation of the test fields in said drawing is highly enlarged and not to scale.

The test field F in a measuring strip according to the invention is divided into sub-fields $F_1$ and $F_2$. Each of these sub-fields in the present example consists of several individual areas $F_{11}$ to $F_{19}$ containing opaque dots and likewise areas $F_{21}$ to $F_{29}$ containing transparent dots (holes). Each area contains a group of dots of equal diameter "d", separated from each other in each group by a same interdistance "i" in the background area.

In the present example the transmission of the areas containing opaque dots of sub-field $F_1$ is 80% and the transmission of the areas containing holes of sub-field $F_2$ is 20%, so that the difference in transmission between these sub-fields is 60%.

Within each sub-field, the diameter "d" of the dots increases from area $F_{11}$ to area $F_{19}$ (opaque dots) and from area $F_{21}$ to area $F_{29}$ (transparent dots or holes), respectively, while the number of dots per area and consequently also per group decreases by their increasing size.

The following table gives values for a practical embodiment of the sub-field $F_1$ (containing opaque dots), which data also apply to sub-field $F_2$ (containing transparent dots):

TABLE

| Group in sub field $F_1$ | $F_{11}$ | $F_{12}$ | $F_{13}$ | $F_{14}$ | $F_{15}$ | $F_{16}$ | $F_{17}$ | $F_{18}$ | $F_{19}$ |
|---|---|---|---|---|---|---|---|---|---|
| "d" (μm) | 4 | 6 | 9 | 12 | 15 | 20 | 25 | 30 | 40 |
| "i" (μm) | 7.9 | 11.9 | 17.8 | 23.8 | 29.7 | 39.6 | 49.5 | 59.4 | 79.3 |
| Transmission % | 20 | 20 | 20 | 20 | 20 | 20 | 20 | 20 | 20 |
| Width of group (mm) | 5 | 5 | 5 | 5 | 5 | 5 | 5 | 5 | 5 |

At the left-hand edge of the test strip a number of the diameter of the dots in microns for the dot groups of sub-fields $F_1$ and $F_2$ is given.

As can be seen from FIG. 1, the individual areas in both sub-fields $F_1$ and $F_2$ (e.g. groups $F_{14}$ and $F_{24}$) are positioned such that the areas containing dots with same diameter (opaque and transparent respectively) are aside each other. Thanks to this arrangement, it is particularly easy to make a direct comparision in dot diameter. The dot diameter in adjacent areas of said sub-fields $F_1$ and $F_2$ has to be equal in a correctly exposed photographic print.

I claim:

1. A measuring strip for evaluating the quality of photographic half tone images which contains on a transparent base a test field (F) divided into at least two sub-fields, wherein (1) a first sub-field ($F_1$) contains a plurality of individual areas each containing a group of opaque dots, wherein each individual area has dots of substantially equal size uniformly distributed in a transparent background area, and wherein (2) a second sub-field ($F_2$) contains a plurality of individual areas each containing a group of transparent dots, wherein each individual area has transparent dots of substantially equal size uniformly distributed in an opaque background area, and wherein in each individual area containing said opaque or transparent dots having substantially the same dot size the dots are substantially equal distance from each other, measured center-to-center, the dots in the individual areas of each sub-field being graduated in size so that an area containing dots of smaller size contains more dots than an area containing dots of a larger size and wherein the light transmission of said first and second sub-field expressed as a percentage is different by at least 10%, and wherein said individual areas in their sub-field have the same transmission.

2. A measuring strip according to claim 1, wherein the light transmission of said first and second sub-field differs by at least 60 to 80%.

3. A measuring strip according to claim 1, wherein the dots have a square or circular shape.

4. A measuring strip according to claim 1, wherein each sub-field contains at least four of said individual areas containing groups of dots of same diameter.

5. A measuring strip according to claim 1, wherein the distance between the dots of equal diameter in the respective areas of the same sub-field increases from one area to the next in the same ratio by which the diameter of the dots decreases, thus giving constant transmission per sub-field.

6. A measuring strip according to claim 1, wherein in one sub-field the areas containing a group of opaque dots with a particular dot diameter are adjacent to areas containing a group of transparent dots of same diameter in the other sub-field.

7. A measuring strip according to claim 1, wherein the smallest dots in the sub-fields have a minimum diameter of 4 micron.

8. A measuring strip according to claim 1, wherein said measuring strip contains said test field (F) divided into said sub-fields ($F_1$) and ($F_2$) in conjunction with a series of halftone areas adjacent to each other having a different transmission ranging from 1 to 99% transmission with increments in transmission of 1% in the group of areas with 1 to 5 and 95 to 99% transmission and increments in transmission of at least 5% in the group of areas with 5 to 95% transmission.

9. A measuring strip according to claim 8, wherein the transmission of said group of half tone areas in the 5 to 95% transmission range vary in increments of 10%.

* * * * *